United States Patent [19]

Hold

[11] Patent Number: 4,542,297
[45] Date of Patent: Sep. 17, 1985

[54] APPARATUS FOR MEASURING PROFILE THICKNESS OF STRIP MATERIAL

[75] Inventor: Anthony C. Hold, Bridgend, Wales

[73] Assignee: British Steel Corporation, United Kingdom

[21] Appl. No.: 367,335

[22] Filed: Apr. 12, 1982

[30] Foreign Application Priority Data

Apr. 27, 1981 [GB] United Kingdom ............... 8112945

[51] Int. Cl.[4] ...................... G01B 15/02; G01T 1/203
[52] U.S. Cl. ............................ 250/360.1; 250/358.1; 250/359.1; 378/55; 378/56
[58] Field of Search ............. 250/358.1, 359.1, 360.1; 378/54, 55, 56, 50, 89

[56] References Cited

U.S. PATENT DOCUMENTS

| | | | |
|---|---|---|---|
| 3,655,979 | 4/1972 | Jernigan, Jr. | 378/55 |
| 3,781,562 | 12/1973 | Singh | 250/360.1 |
| 3,868,510 | 2/1975 | Murata et al. | 378/55 |
| 4,371,897 | 2/1983 | Kramer | 358/294 |
| 4,467,208 | 8/1984 | Müller et al. | 250/483.1 |

FOREIGN PATENT DOCUMENTS 1413318 12/1972 United Kingdom .
1383160 4/1973 United Kingdom .

*Primary Examiner*—Janice A. Howell
*Assistant Examiner*—Constantine Hannaher
*Attorney, Agent, or Firm*—Bacon & Thomas

[57] ABSTRACT

This invention provides apparatus for measuring the thickness profile of steel strip comprising a radiation source reciprocally movable in a stepwise fashion across the strip width on one side thereof and a single elongated detector on the other side of the strip aligned with the scanning source. This detector may be a fluorescent scintillator which is responsive to the incident radiation, the amount of which is in turn dependent on the degree of absorption by the strip. Means are provided for sensing the degree of excitation in the detector in synchronism with the scanning source whereby to provide an output representative of the thickness profile of the strip. The profile may conveniently be displayed in analogue fashion on a television screen. A conventional thickness gauge, e.g. of the X-ray type, may conveniently be used in conjunction with the profile gauge to compensate the output of the latter for any variations in the strip thickness along the length of the coil.

12 Claims, 4 Drawing Figures

APPARATUS FOR MEASURING PROFILE THICKNESS OF STRIP MATERIAL

This invention relates to apparatus for measuring the thickness profile of strip material and particularly but not exclusively relates to the on-line measurement of hot rolled steel strip. The term strip in this context is to be understood to embrace sheet and plate.

The market for hot rolled strip is such as to demand a smooth cigar-shaped profile with, say, less than $5\mu$ edge-to-edge thickness differential and less than $70\mu$ 'crown'—that is the difference between the thickness at the edges on the one hand and the centre thickness of the other. Such targets are only attainable by very close control of the rolling parameters and thus rapid, detailed information of the physical parameters of the strip is required as it is being rolled.

Hitherto, this information has been obtained off-line, from accurate contact measurements—but this can only provide historical records—or on-line by a scanning mechanism which provides a fast read-out so that rapid corrective action may be taken. In this latter regard measurements across the width can be made by together physically traversing a single radiation source and an associated detector on the two limbs of a 'C'-frame across the strip, or physically traversing a single radiation source across the strip with a plurality of fixed detectors on the other limb, or a plurality of fixed sources with an equal or different number of fixed detectors. All these techniques suffer from drawbacks however, movement of the whole 'C'-frame in the first embodiment is cumbersome, slow and energy consuming, or alternatively movement of the individual source/detector in synchronism is complex and with two moving mechanisms, wear and inertia are a problem; in the second embodiment the provisions of a plurality of fixed detectors means that measurements may only be made at a number of discrete points and difficulties may ensue in 'collecting' the data from these detectors and ensuring that each detector responds to radiation incident only on itself and not the adjacent detectors.

It is an object of this invention to provide an improved apparatus which avoids or mitigates these drawbacks.

From one aspect, the present invention provides apparatus for measuring the thickness profile of strip, comprising a radiation source reciprocally movable across the strip width on one side thereof and a single elongated detector on the other side, aligned with the scanning source, responsive to incident radiation the amount of which is dependent on the degree of absorption by the strip, and means for sensing the degree of excitation in the detector in synchronism with the scanning source whereby to provide an output representative of the said thickness profile.

Conveniently, the source is a radio-isotope, eg Americium 241, and this is driven across the strip width in fast discrete steps by a pulsed 'stepper' motor. More particularly a linear array of such sources may be used, disposed in the direction of travel of the strip, in order to enhance the output.

The detector is continuous in the sense that it is a single integrated unit and it may conveniently be a fluorescent plastics scintillator, a myriad of scintillation particles being embedded in a plastics matrix, the (visible) light output from which being collected by photo-multipliers mounted on each end of the plastics 'rod'.

The profile is preferably displayed in analogue fashion, on a television screen from a study of which the operator may readily adjust the rolling parameters to compensate for errors in gauge, and thickness profile, and in this regard the edge of the strip, which is used as the datum for the trace, is identified by the instantaneous change in the amount of radiation incident on the scintillator as the source traverses the strip edge. The time-base for the trace—the X-ordinate—is governed by the stepper motor each time so as to effect the reciprocating scan across the strip.

Any non-linearity in the scintillator may be compensated for electronically, or alternatively an absorbent material of varying thickness may be placed along the length of the incident radiation 'window' in the scintillator rod.

A conventional thickness gauge may conveniently be used in conjunction with the profile gauge to compensate the output of the latter for any variations in the strip thickness along the length of the coil.

In order that this invention may be fully understood, one embodiment thereof will now be described, by way of example, with reference to the accompanying drawings, in which:

FIG. 1 schematically illustrates the principle of apparatus according to the invention;

Figure 1:
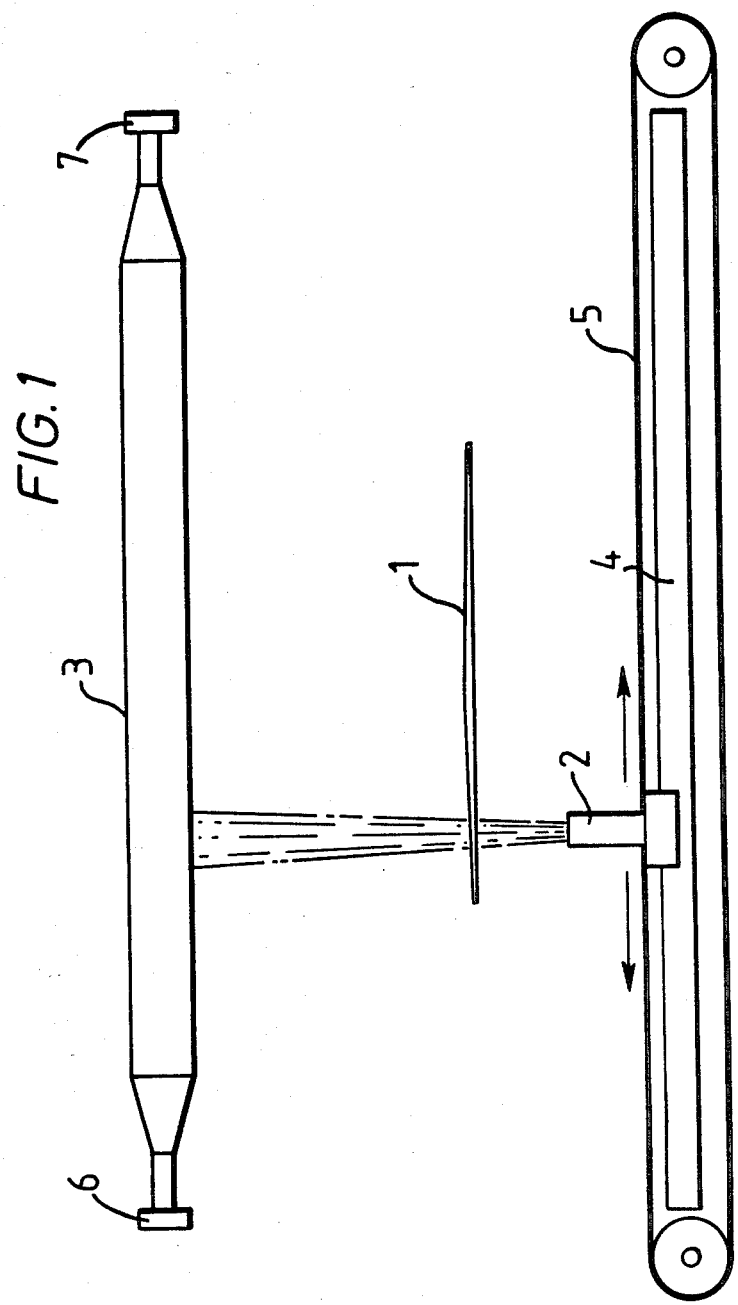

Referring now to FIG. 1 hot-rolled strip steel 1 passes, in a direction normal to the plane of the paper, between a reciprocally transported radiation source 2 and an elongate plastics scintillator 3 aligned with the path of movement of the source. This source oscillates back and forth along a bed 4, being transported by a belt 5 driven by a motor (not shown) in stepwise fashion.

The source, eg Americium 241, emits radiation which is transmitted through the strip 1 with varying degrees of attenuation dependent on strip thickness and excites the scintillator 3 the light from which is collected at each end by photo-multipliers 6,7. The outputs from these latter units are then summated and displayed on a c.r.t., directly illustrating the strip profile, in a manner to be described.

Figure 2:
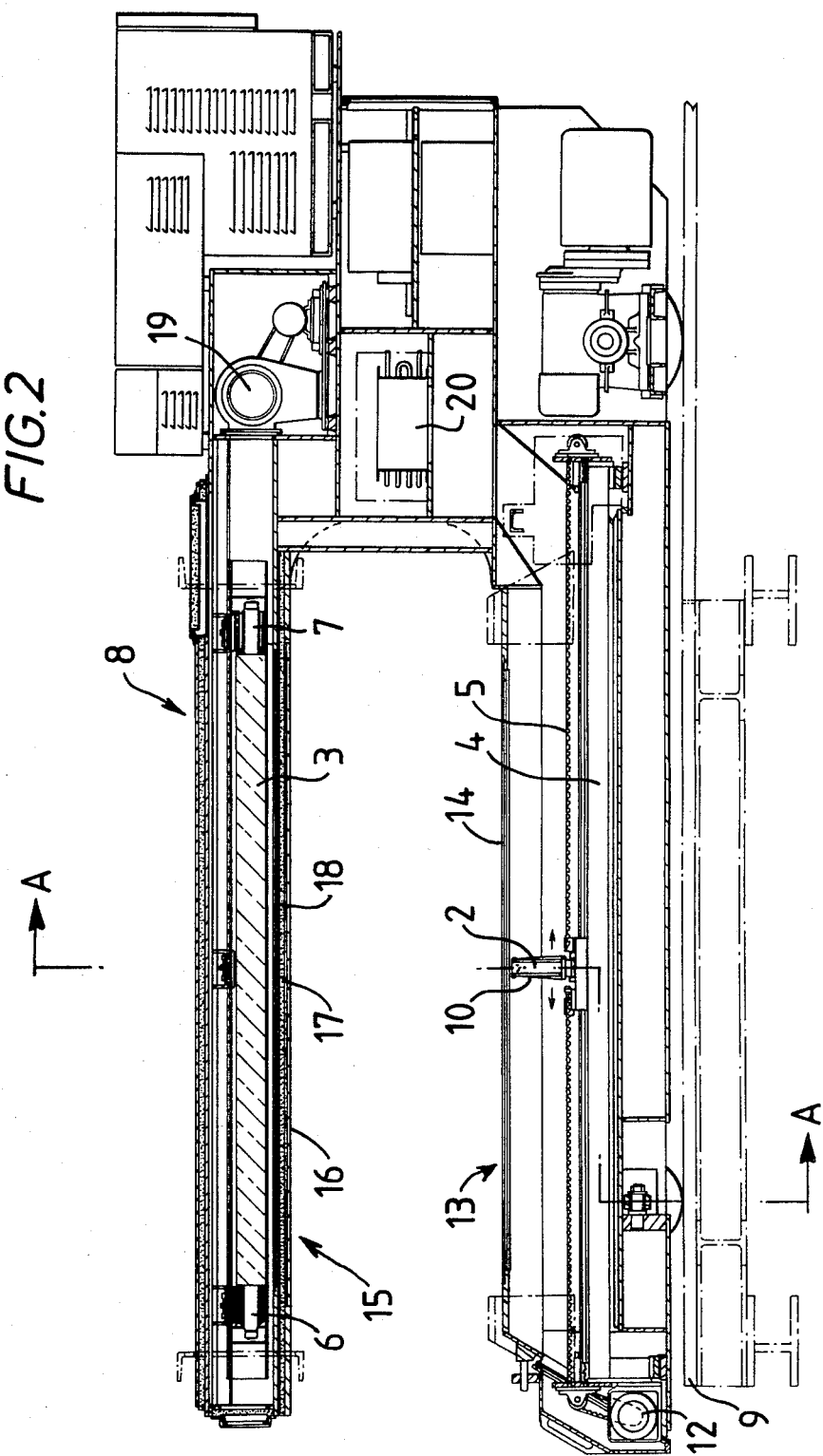
FIG. 2 illustrates a sectional side elevation of the apparatus.
Figure 3:
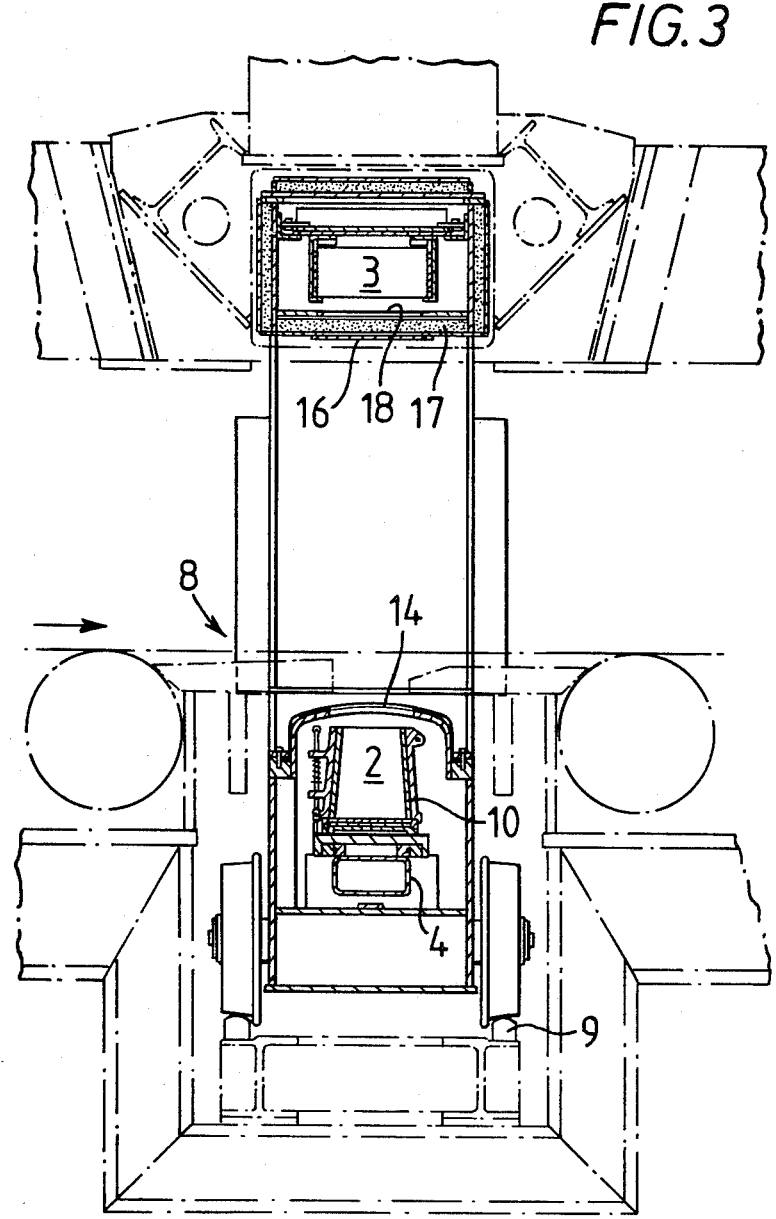
FIG. 3 illustrates a sectional end elevation of the apparatus along A—A.

FIGS. 2 and 3 together illustrate the apparatus in more detail.

Referring to these Figures the essential elements are all housed within a C-frame 8 which is transportable into position on the hot mill along rails 9. Housed within the lower limb of this frame is the radio-isotope source 2 which actually comprises a linear array of four sealed units of Americium 241 each of 1.25 curies. These are mounted in a block of lead 10 which has a rectangular aperture in its upper side so as to define a beam of radiation which is itself of rectangular cross-section, with the longitudinal axis parallel to the rolling direction. The lower limb completely encases the source 2 and its drive mechanism, namely the belt 5 and the motor 12 together with the associated guide bed 4, but defines a slot 13 along the length of its upper side which in turn is completely sealed by a thin sheet of a titanium alloy 14 backed by a ceramic paper fibre.

The upper limb of the C-frame houses the plastics scintillator 3, eg type NE110, against the two plane ends of which abut photo-multiplier tubes 6,7. Again, this upper limb completely encases these items but defines a slot 15 in its lower side which in turn is completely sealed by a thin sheet of titanium alloy 16 together with ceramic fibre padding 17. Inwardly mounted of this padding is a profiled aluminium sheet 18 (or a series of aluminium shims) which serves to compensate the scintillator for light losses along its length and provide it with a more uniform and linear response.

Mounted within the body of the C-frame is a blower motor 19 by which nitrogen gas is circulated within the unit—around both the top and bottom limbs—the circulating gas being cooled by cooler unit 20. The purpose of this is for both cooling and reducing the build-up of moisture in the unit which operates of course in a very harsh mill environment.

In operation then, as the hot-rolled steel strip passes between the upper and lower limbs of the C-frame, the radio-isotope source is oscillated to and fro at a rate of say about ½ meter/sec in a rapid stepwise fashion by the pulsed stepper motor 12. The amount of radiation incident on the scintillator 3 at any instant is dependent on the thickness profile of the strip at that instant and this is determined by the detector (including the photo-multipliers) processed and transmitted to a c.r.t. display unit (not shown) in the mill operator's control console.

The time-base for the trace is governed by the stepper motor control signals and the reversal of the motor 12 is effected automatically on detection of the significant change in incident radiation on the scintillator as the source 2 traverses the strip edge.

Figure 4:
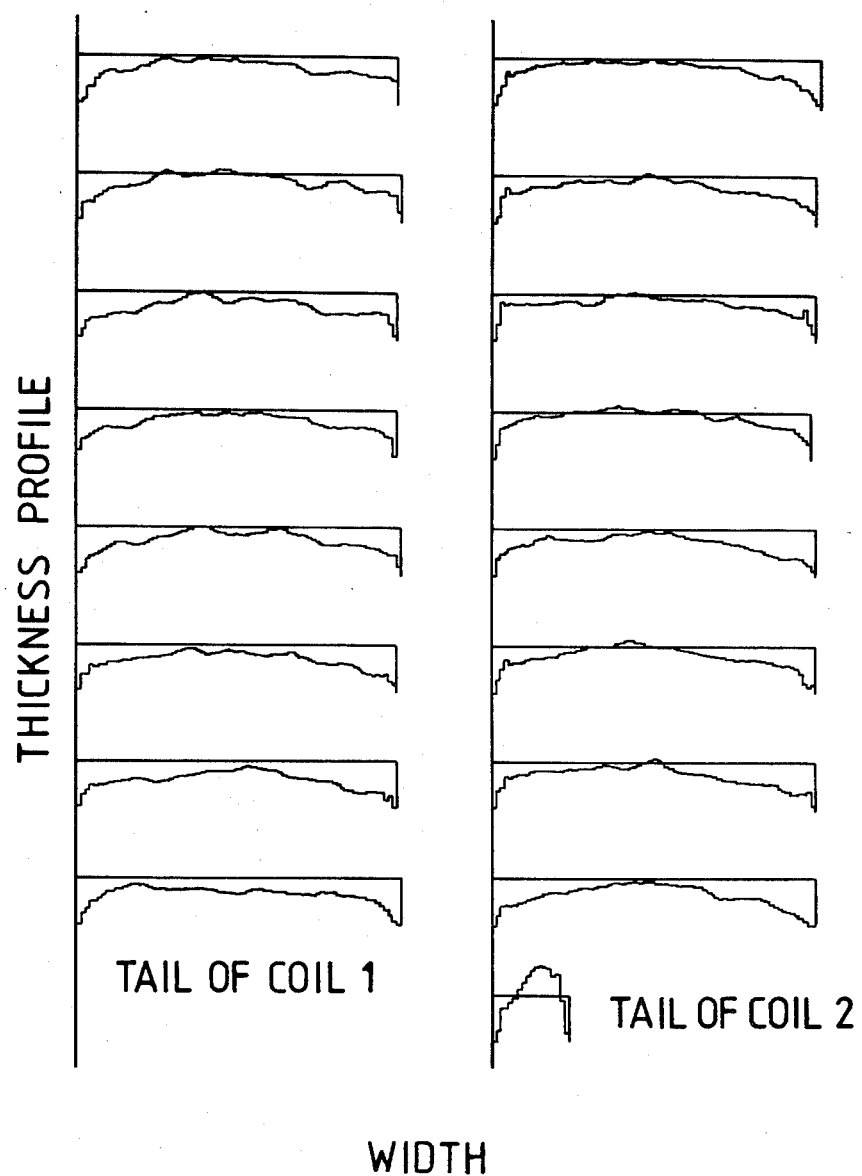
FIG. 4 illustrates typical display traces of hot rolled strip.

Two examples of the type of trace displayed are shown in FIG. 4 the strip width being depicted along the X-axis and the strip profile—exaggerated—being depicted on the Y-axis. The discrete stepwise response is evident, this is in accord with the source movement of course, and from this trace the operator may discern any variation in the thickness profile which needs correction.

The apparatus described may conveniently be used in conjunction with a conventional thickness gauge, eg an X-ray or radio-isotope gauge mounted in an external housing, disposed to measure the centre line thickness of the strip. In this manner any variation in the magnitude of the output due to changes in strip thickness along the length of the coil of strip may be compensated by adjusting the signal output from the detector at each interval across the width of the strip in dependence on the thickness gauge reading.

Although the invention has been described with reference to the particular embodiment illustrated, it is to be understood that various modifications may readily be made without departing from the scope of the invention. For example, the particular manner in which the scintillator and radiation source are screened may be different from that shown. Titanium alloy screening was simply chosen because it happens to be both robust and temperature resistant whilst being of comparatively low density so as not to absorb too much radiation. Other materials could alternatively be adopted in which case it may be possible to dispense with the heat insulating ceramic fibre, particularly the padding which protects the plastics scintillator. Indeed other forms of 'continuous' detectors may be used, eg a gas-filled ionisation chamber.

Likewise the provision of profiled aluminium or aluminium shims physically to linearise the scintillator response may be dispensed with in favour of other absorbent materials which may perhaps more readily be profiled, eg perspex. Alternatively, as previously indicated, such linearisation may be effected electronically.

I claim:

1. Apparatus for measuring the thickness profile of strip, comprising a radiation source reciprocally movable across the strip width on one side thereof and a single elongated detector on the other side, aligned with the scanning source, responsive to incident radiation the amount of which is dependent on the degree of absorption by the strip, said detector being in the form of a rod like scintillator device having a myriad of scintillation particles embedded in a matrix; and means for sensing the light output from the detector in syncrhonism with the scanning source whereby to provide an output representative of the said thickness profile, said means for sensing comprising photo-multiplier means arranged to collect the aggregate light output from along the length of the detector.

2. Apparatus according to claim 1, in which the light output from the detector is collected by photomultipliers disposed at each end of the scintillator.

3. Apparatus according to claim 2, in which the detector output is compensated for any non-linearity in response along its length.

4. Apparatus according to claim 3, in which the compensation is effected by radiation absorbent material.

5. Apparatus according to claim 4, in which the radiation source is a radio-isotope.

6. Apparatus according to claim 5 comprising a linear array of said sources disposed in the direction of travel of the strip.

7. Apparatus according to any one of claims 1 to 6, in which the radiation source is driven across the strip in discrete steps by a pulsed stepper motor.

8. Apparatus for measuring the thickness profile of movable strip, comprising a unit defining a C-shaped frame having upper and lower arms positioned across the strip width, a radio-isotope source mounted in the lower arm and reciprocally movable across the strip width and a rod-like fluroescent plastics scintillator mounted in the upper arm in alignment with the path of travel of said source, the light output from the scintillator being dependent on the degree of absorption by the strip, and photo-multiplier means for measuring the aggregate light output from along the length of the scintillator in synchronism with the movement of said source whereby to provide a representation of said thickness profile.

9. Apparatus according to claim 8, in which the thickness profile is visually displayed.

10. Apparatus according to claim 9, in which the said unit is sealed and gas cooled from within.

11. Apparatus according to claim 8, comprising a pulsed stepper motor in said unit for driving the radio-isotope source across the strip in discrete steps.

12. Apparatus according to any one of claims 8 to 11, in which the output representative of the thickness profile is compensated and adjusted at intervals across the width of the strip in accordance with the reading at that corresponding interval from a strip thickness gauge utilised in conjunction therewith.

* * * * *